United States Patent [19]

Kudoh et al.

[11] Patent Number: 5,478,870
[45] Date of Patent: Dec. 26, 1995

[54] ACRYLIC RESIN-MODIFIED EPOXY-POLYAMINE COMPOSITION

[75] Inventors: Masanobu Kudoh; Hidehiko Haneishi, both of Hiratsuka, Japan

[73] Assignee: Kansai Paint Co., Ltd., Hyogo, Japan

[21] Appl. No.: 295,459

[22] Filed: Aug. 25, 1994

Related U.S. Application Data

[62] Division of Ser. No. 249,973, May 27, 1994.

[30] Foreign Application Priority Data

May 28, 1993 [JP] Japan ................................ 5-148409
Apr. 21, 1994 [JP] Japan ................................ 6-105001

[51] Int. Cl.$^6$ .................................................. C08L 63/00
[52] U.S. Cl. ........................ 523/409; 525/107; 525/119; 525/423; 525/528; 525/529; 525/530; 525/533
[58] Field of Search .......................... 523/409; 525/107, 525/119, 423, 528, 529, 530, 533

[56] References Cited

U.S. PATENT DOCUMENTS

| | | | |
|---|---|---|---|
| 4,458,040 | 7/1984 | Suzuki et al. .......................... | 523/412 |
| 4,501,831 | 2/1985 | Chu et al. .............................. | 523/412 |
| 4,503,174 | 3/1985 | Vasta ...................................... | 523/439 |
| 5,073,602 | 12/1991 | Nakao et al. ........................... | 525/514 |
| 5,137,990 | 8/1992 | Corley .................................... | 525/502 |
| 5,212,216 | 5/1993 | Hattori et al. .......................... | 523/415 |
| 5,270,356 | 12/1993 | Katamoto et al. ..................... | 523/409 |
| 5,283,290 | 2/1994 | Jung et al. ............................. | 525/111 |

FOREIGN PATENT DOCUMENTS

| | | |
|---|---|---|
| 0183463 | 6/1983 | European Pat. Off. . |
| 2-228376 | 9/1990 | Japan . |
| 1580919 | 12/1980 | United Kingdom . |
| 2102818 | 2/1983 | United Kingdom . |

*Primary Examiner*—Robert E. Sellers
*Assistant Examiner*—Randy Gulakowski
*Attorney, Agent, or Firm*—Wenderoth, Lind & Ponack

[57] ABSTRACT

An aqueous resin dispersion which comprises as the chief component acrylic-modified epoxy-polyamine resin composed of a bisphenolic epoxy resin containing at least two epoxy groups per molecule; and, as bound to at least a part of said epoxy groups, an acrylic resin having on the average at least one functional group which is capable of reacting with said epoxy group, per molecule, the molecular weight distribution of said acrylic resin as expressed by its weight average molecular weight (Mw)/number average molecular weight (Mn) being within a range of 1 to 1.2, and an active hydrogen-containing amino compound. Said aqueous resin dispersion may further optionally contain non-ionic, film-forming resin. Such dispersions are useful for cationic electrodeposition paint which can form a coating excelling in weatherability and corrosion resistance.

23 Claims, No Drawings

ACRYLIC RESIN-MODIFIED EPOXY-POLYAMINE COMPOSITION

This application is a division of application Ser. No. 08/249,973, filed May 27, 1994, now allowed.

DETAILED DESCRIPTIONS OF THE INVENTION

This invention relates to a novel aqueous resin dispersion. More particularly, the invention relates to an aqueous resin dispersion which is capable of forming a coating excelling in such properties as weatherability and corrosion resistance and is suitable, in particular, for use in cationic electrodeposition paint compositions.

As an aqueous resin dispersion for cationic electrodeposition paint compositions, a composition composed of an epoxy-polyamine resin formed by a reaction of an epoxy resin with an active hydrogen-containing amino compound, and a blocked polyisocyanate compound which is blended as a curing agent, has already been put to practical use. While coating formed of this composition excels in corrosion resistance, it still has the defect of insufficient weatherability.

In order to improve the weatherability, modification of the epoxy resin with a polyester resin, polyether resin, acrylic resin or the like has been tried. While those attempts more or less succeeded in improving the weatherability, they give rise to another problem that the characteristic corrosion resistance of epoxy resin is decreased.

In particular, in the attempts to modify the epoxy resin with an acrylic resin, to cause the modification reaction to a sufficient extent is itself difficult due to poor compatibility of these two components, and furthermore the resultant modified product shows the deficiency of high viscosity.

The present inventors have engaged in concentrative studies with the view to develop an aqueous resin composition which can form a coating excelling in both corrosion resistance and weatherability, and now discovered that the above object can be accomplished by using, for modifying the epoxy resin, a specific acrylic resin whose molecular weight distribution region is controlled to be within a narrow range. The present invention is thus completed.

Thus, according to the present invention, an aqueous resin dispersion which comprises, as the chief component, an acrylic-modified epoxy-polyamine resin composed of:

(A) a bisphenolic epoxy resin containing at least two epoxy groups per molecule; and following components (B) and (C) which are bound to at least a part of said epoxy groups:

(B) an acrylic resin having on the average at least one functional group which is capable of reacting with said epoxy group, the molecular weight distribution of said acrylic resin as expressed by weight average molecular weight (Mw)/number average molecular weight (Mn) being within the range of 1–1.2; and (C) an active hydrogen-containing amino compound; is provided.

Hereinafter each of the above components constituting the aqueous resin dispersion of the present invention is explained in further details.

Bisphenolic epoxy resin (A):

Bisphenolic epoxy resin (A) is a low or high molecular weight compound having at least two epoxy groups per molecule. In particular, such a diglycidyl ether of bisphenol, which is obtained by a condensation reaction between a bisphenolic compound and epihalohydrin, for example, epichlorohydrin, readily forms a coating excelling in flexibility and corrosion resistance and, therefore, is preferred.

Typical examples of bisphenolic compounds useful for the preparation of epoxy resin (A) include bis(4-hydroxyphenyl)-2,2-propane, bis(4-hydroxyphenyl)-1,1-ethane, bis(4-hydroxyphenyl)-methane, 4,4'-dihydroxydiphenyl ether, 4,4'-dihydroxydiphenyl sulfone, bis(4-hydroxyphenyl)-1,1-isobutane, bis(4-hydroxy-3-t-butylphenyl)-2,2-propane and the like.

Of those epoxy resins (A) formed from such bisphenolic compounds, a bisphenol A-derived diglycidyl ether which is represented by the formula below is particularly preferred, because it gives a coated film excelling in flexibility and corrosion resistance:

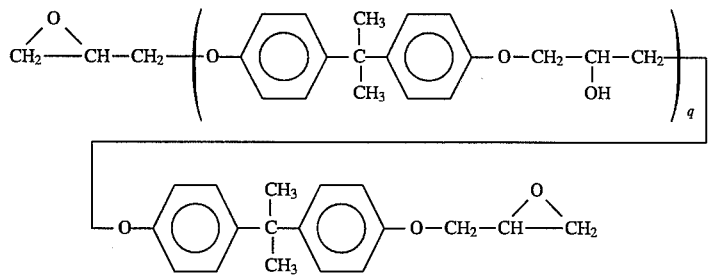

(in which q stands for a number of 2 to 20).

As the epoxy resin (A), furthermore, a product obtained upon etherification reaction of the excess amount of a diglycidyl ether of bisphenol, a condensation reaction product of a bisphenolic compound with epihalohydrin, with still another bisphenolic compound, can also be advantageously used.

Preferred epoxy resin (A) to be used in the present invention generally has a number average molecular weight ranging from about 310 to about 10,000, more preferably from about 320 to about 6,000, inter alia, from about 320 to about 2,000. Furthermore, its epoxy equivalent is within the range of from about 155 to about 5,000, preferably from about 160 to about 3,000, and still more preferably from about 160 to about 1,000.

Acrylic resin (B):

Acrylic resin (B) useful for the present invention has per molecule, on the average at least 1, preferably 1–2, functional groups which are reactive with the epoxy groups of above-described epoxy resin (A); and has the molecular weight distribution expressed by weight average molecular weight (Mw)/number average molecular weight (Mn) within a range of 1 to 1.2. As such functional groups reactive with the epoxy groups, for example, carboxyl, hydroxyl, unsubstituted or mono- or di-substituted amino and mercapto groups, etc. may be named.

Such acrylic resin (B) includes, for example, copolymers of polymerizable unsaturated monomers (a) having such functional groups capable of reacting with epoxy groups as above-named and other unsaturated monomers (b) copolymerizable therewith. Here the monomer (a) is a compound having at least one each of such functional group reactable with epoxy group as above-named and a polymerizable, unsaturated bond, per molecule. Examples of such monomers (a) include $\alpha$, $\beta$-unsaturated carboxylic acids such as acrylic acid and methacrylic acid; hydroxyalkyl esters of (meth)acrylic acid such as hydroxyethyl acrylate, hydroxyethyl methacrylate, hydroxypropyl acrylate and hydroxypropyl methacrylate; and mono- or dialkylaminoalkyl esters of (meth)acrylic acid such as 2-(dimethylamino)ethyl acrylate and 2-(dimethylamino)ethyl methacrylate.

Whereas, as other unsaturated monomers (b) which are copolymerizable with these monomers (a), for example, the following may be named: alkyl or cycloalkyl esters of (meth)acrylic acid such as methyl (meth)acrylate, ethyl (meth)acrylate, propyl (meth)acrylate, n-butyl (meth) acrylate, isobutyl (meth) acrylate, tert-butyl (meth)acrylate, 2-ethylhexyl (meth)acrylate, cyclohexyl (meth)acrylate, n-octyl (meth)acrylate, lauryl (meth)acrylate, dodecyl (meth)acrylate, stearyl (meth)acrylate, etc; alkoxyalkyl esters of (meth)acrylic acid such as methoxybutyl (meth)acrylate, methoxyethyl (meth)acrylate, ethoxybutyl (meth)acrylate, etc.; aralkyl esters of (meth)acrylic acid such as benzyl (meth)acrylate, etc.; glycidyl (meth)acrylate or adducts of hydroxyalkyl esters of (meth)acrylic acid with monocarboxylic acid compounds such as of capric acid, lauric acid, linoleic acid, oleic acid and the like; adducts of (meth)acrylic acid with monoepoxy compounds such as "CARDURA® E10" (manufactured by Shell Chemical Co.); and vinyl aromatic compounds such as styrene, $\alpha$-methylstyrene, vinyltoluene, p-chlorostyrene, p-tert-butylstyrene, etc.

Copolymerization of above monomers (a) and (b) can be carried out by, for example, anionic polymerization, cationic polymerization, group-transfer polymerization (cf. GB-A-2102818) or the like. In particular, when 1,1-bis(trimethylsiloxy)-2-methyl-1-propene is used as an initiator in group-transfer polymerization method, the molecular terminals automatically become carboxyl groups, and furthermore all the molecules come to have only one carboxyl group. This polymerization method, therefore, is particularly preferred.

The ratio of said monomer (a) to the monomer (b) is not critical, so long as the resulting acrylic resin (B) comes to have, on the average, at least one functional group per molecule which is reactive with epoxy group. Whereas, generally it is preferred to use 0.1–10 wt %, in particular, 1–5 wt %, of monomer (a) and 99.9–90 wt %, in particular, 99–95 wt %, of monomer (b), based on the total weight of the two monomers. While the acrylic resin (B) preferably has at least 1, more preferably 1–2, functional groups per molecule which are reactable with epoxy groups, it is permissible that molecules having none of such functional group and those containing two or more functional groups are concurrently present in the resin, the number of the functional groups being, on the average, at least 1, preferably 1–2, per molecule.

Number average molecular weight (Mn) of acrylic resin (B) is subject to no critical limitation, but normally preferred range is from about 1,500 to about 5,000, more preferably from about 2,300 to about 5,000, most preferably from about 3,000 to about 5,000. It is important for acrylic resin (B) to have a molecular weight distribution, which is expressed as weight average molecular weight (Mw)/number average molecular weight (Mn), of 1–1.2, in particular, 1–1.1. When the molecular weight distribution of acrylic resin (B) is greater than 1.2, compatibility of acrylic resin (B) and epoxy resin at high molecular weight region is reduced, and the formed acrylic-modified epoxy resin solution comes to have undesirably high viscosity.

Active hydrogen-containing amino compound (C):

The active hydrogen-containing amino compound useful for the present invention contains at least 1, preferably 1–4 active hydrogen atoms which are reactable with epoxy groups. Such compounds include aliphatic, alicyclic or aromatic-aliphatic primary or secondary amines, alkanolamines, their modification products, tertiary amine salts, and the like. As such active hydrogen-containing amino compounds, for example, the following may be named:

(1) compounds derived from amine compounds containing one secondary amino group and at least one primary amino group, such as diethylenetriamine, hydroxyethylaminoethylamine, ethylaminoethylamine, methylaminopropylamine and the like, whose primary amino group(s) is(are) converted into aldimine, ketimine, oxazoline or imidazoline, by a reaction under heating with ketone, aldehyde or carboxylic acid, at temperatures of, for example, 100°–230° C.;

(2) secondary monoamines such as diethylamine, diethanolamine, di-n- or iso-propanolamine, N-methylethanolamine, N-ethylethanolamine and the like;

(3) secondary amino group-containing compounds formed by adding monoalkanolamines such as monoethanolamine and dialkyl (meth)acrylamide by means of Michael addition reaction;

(4) compounds derived from alkanolamines such as monoethanolamine, neopentanolamine, 2-aminopropanol, 3-aminopropanol, 2-hydroxy-2'-(aminopropoxy)ethylether, and the like, whose primary amino group is converted into ketimine; and (5) salts of tertiary amines such as dimethylethanolamine, triethylamine, trimethylamine, triisopropylamine, methyldiethanolamine, etc., with such organic acids as acetic acid, butyric acid, etc.

Acrylic-modified epoxy-polyamine resin:

The acrylic-modified epoxy-polyamine resin useful for the present invention is obtained by binding acrylic resin (B) and active hydrogen-containing amino compound (C) with a part or whole of the epoxy groups of above-described epoxy resin (A). Methods of reacting above components are subject to no critical limitation, but any methods known per se may be employed. Specifically, those methods exemplified below can be adopted:

1) An epoxy resin (A) is caused to react simultaneously with an acrylic resin (B) and active hydrogen-containing amino compound (C).

2) A part of epoxy groups in an epoxy resin (A) are first caused to react with an acrylic resin (B), and then a part or whole of the remaining epoxy groups in the same resin (A) are caused to react with an active hydrogen-containing amino compound (C).

3) First a part of epoxy groups in an epoxy resin (A) are caused to react with an active hydrogen-containing amino compound (C) and then a part or whole of the remaining epoxy groups in the same resin (A) are caused to react with an acrylic resin (B).

4) A part of epoxy groups in a diglycidyl ether of bisphenol for preparing epoxy resin (A) are caused to react with an acrylic resin (B), the remaining epoxy groups are further caused to react with a bisphenolic compound, and then the resin is caused to react with an active hydrogen-containing amino compound (C).

Of the above, the method 2) is the most preferred.

The reaction of epoxy groups in epoxy resin (A) with the functional groups of acrylic resin (B) can be conducted under heating at about 60° C.—about 200° C. for about an hour—about 24 hours, in the absence of catalyst or in the presence of such a catalyst as, for example, a tertiary amine such as triethylamine, tributylamine, dimethylbenzylamine, etc.; or a quaternary ammonium salt such as tetrabutylammonium benzoate, tetrabutylammonium bromide, etc.

The reaction of active hydrogen-containing amino compound (C) with epoxy groups of epoxy resin (A) can be carried out, for example, at temperatures ranging from about 30° C. to about 160° C., for about 1 to about 5 hours.

The reaction ratio among the components of epoxy resin (A), acrylic resin (B) and active hydrogen-containing amino compound (C) is variable over a wide range according to individual usages intended. Whereas, it is generally preferred to use, based on the sum weight of epoxy resin (A) and acrylic resin (B), 16–90 wt%, in particular, 35–80 w%, and most preferably 50–70 wt%, of acrylic resin (B). Furthermore, active hydrogen-containing amino compound (C) is preferably used in such an amount as will make the amine value of resultant acrylic-modified epoxy-polyamine resin in the range of 15–100, in particular, 15–70, and most preferably, 15–47.

Thus formed acrylic-modified epoxy-polyamine resin normally is preferred to have a number average molecular weight within a range of 1,000–20,000, in particular, 1,700–12,000, and most preferably, 2,400–4,000.

The acrylic-modified epoxy-polyamine resin preferably contains primary hydroxyl groups. While the range of such primary hydroxyl equivalent is not critical, normally preferred range is 400–700, in particular, 400–625, and most preferably, 400–550. Active hydrogen-containing functional groups such as primary hydroxyl groups originating from acrylic resin (B) and active hydrogen-containing amino compound (C) and secondary hydroxyl groups, which are present in epoxy resin (A), are useful as reactive functional groups with a crosslinking agent.

Said acrylic-modified epoxy-polyamine resin may also be reacted with such reaction reagent as a tertiary amine salt, monocarboxylic acid, secondary sulfide salt, monophenol and monoalcohol, for controlling dispersibility of the resin in water or improving smoothness of its coated film.

Furthermore, it is also possible to introduce into the acrylic-modified epoxy-polyamine resin such crosslinking functional groups as blocked isocyanate groups, β-hydroxycarbamate groups, α, β-unsaturated carbonyl groups, or N-methylol groups, to impart internal (self)crosslinking ability to the resin.

Above reactions with the reagents and introduction of crosslinking functional groups may be conducted before adding an active hydrogen-containing amino compound (C) to the acrylic-modified epoxy resin.

The resultant acrylic-modified epoxy-polyamine resin can be used concurrently with an external crosslinking agent. As useful external crosslinking agent, compounds having at least 2 crosslinking functional groups per molecule, for example, blocked polyisocyanate, β-hydroxycarbamic acid ester of polyamine, maronic acid derivatives, methylolated melamine, methylolated urea, etc. can be named. The blend ratio (solid ratio) between the acrylic-modified epoxy-polyamine resin and such external crosslinking agent is not strictly limited, while normally a range of 100/0–60/40, in particular, 85/15–75/25, is preferred.

Above-described acrylic-modified epoxy-polyamine resin in accordance with the present invention can be formed into an aqueous resin dispersion, by dissolving or dispersing it in an aqueous medium.

Aqueous resin dispersions of the acrylic-modified epoxy-polyamine resin can be prepared, for example, by protonating amino groups in the resin with a water-soluble organic acid such as formic, acetic, or butyric acid, and the like, to cause dissolution or dispersion of the resin in an aqueous medium.

The amount (neutralization number) of the acid used for said protonation cannot be strictly defined, but normally a range of about 5—about 40 KOH mg number, in particular, 10–20 KOH mg number, per gram of the solid resin, is preferred for favorable electrodeposition characteristics. Thus obtained aqueous resin dispersion is particularly suited for use for cationic electrodeposition paint, to which pigment, solvent, curing catalyst, surfactant, etc. may optionally be added as occasion demands.

Above-described aqueous resin dispersion of the present invention can provide, when applied onto an object, a coating excelling in weatherability, and furthermore, in corrosion resistance and in appearance as well, because the acrylic-modified epoxy-polyamine resin therein has been modified with an acrylic resin having the specific, narrow molecular weight distribution and consequently compatibility of the epoxy resin and acrylic resin in the coating is high.

It is now discovered, furthermore, that combined use of said acrylic-modified epoxy-polyamine resin component with non-ionic film-forming resin component excelling in weatherability, such as acrylic resin, polyester resin and the like, provides resin compositions capable of forming a coating of still more improved weatherability and corrosion resistance, which are particularly useful for cationic electrodeposition paint.

According to the present invention, therefore, further a resin composition comprising (I) the above-described acrylic-modified epoxy-polyamine resin, and (II) non-ionic, film-forming resin at a ratio of: resin (I):resin (II)=15:85–95:5 (by weight), which is particularly suitable for use in cationic electrodeposition paint, is provided.

It is important and indispensable for resin (II) to be used in this resin composition that it is non-ionic, viz., it does not contain any functional group (e.g., carboxyl group or amino group) which forms cationic group upon neutralization with acid. It is desirable that this resin (II) is substantially not reactive with resin (I), while it may react with such a crosslinking agent as above-named. More specifically, acrylic resins, polyester resins, polyester-modified resins and silicone-modified resins which particularly excel in weatherability are conveniently used, the most preferred being acrylic resins.

Hereinafter such resins which are conveniently used as resin (II) are explained in further detail.

As non-ionic acrylic resins, those products obtained through homo- or co-polymerization, which is carried out in the manner known per se, of one or more of acrylic monomers such as alkyl esters of (meth)acrylic acid, e.g., methyl (meth)acrylate, ethyl (meth)acrylate, butyl (meth)acrylate, propyl (meth)acrylate, 2-ethylhexyl (meth)acrylate; hydroxyalkyl esters of (meth)acrylic acid, e.g., hydroxyethyl (meth)acrylate, hydroxypropyl (meth)acrylate; or of such acrylic monomer or monomers used as the chief component, in optional combination with one or more of other unsaturated monomers, which are suitably selected according to the desired physical properties, such as styrene and derivatives thereof (for example, α-methylstyrene), (meth)acrylonitrile, butadiene, etc. can be used.

The non-ionic acrylic resin (II) suitably has a number average molecular weight in a range of about 3,000—about 100,000, preferably from about 3,500—about 75,000, more preferably from about 4,000 to about 50,000. Furthermore, when the acrylic resin (II) is caused to contain hydroxyl groups as the functional group, it reacts with a polyisocyanate compound which is a crosslinking agent for the resin (I), to be crosslinked and cured.

Non-ionic polyester resins which can be used as the resin (II) include the products of condensation polymerization, which is carried out in the manner known per se, of polybasic acid component such as, for example, phthalic acid and acid anhydride thereof, isophthalic acid, terephthalic acid, trimellitic acid and acid anhydride thereof, pyromellitic acid and acid anhydride thereof, hexahydrophthalic acid and acid anhydride thereof, succinic acid, adipic acid, pimelic acid, sebacic acid, brasylic acid and the like; with polyol component such as ethylene glycol, diethylene glycol, propylene glycol, neopentyl glycol, 1,6-hexanediol, trimethylolpropane, glycerin, pentaerythritol, tricyclodecane dimethanol and the like. In that occasion, molecular weight of the product may be controlled by using as a terminal blocking agent, for example, benzoic acid, p-t-butylbenzoic acid, etc.

Thus obtained polyester resin can generally have a number average molecular weight within a range of from about 300 to about 50,000, preferably from about 2,000 to about 20,000.

It is also feasible to use as the resin (II) a blend of aforesaid acrylic resin and the polyester resin. Furthermore, polyester-modified (grafted) acrylic resins or acrylic-modified (grafted) polyester resins can be synthesized by combining earlier described starting materials, and such modified resins can also be used as said resin (II). (In the present specification, they are collectively referred to as "polyester-modified resin".)

Non-ionic silicone-modified resins useful as said resin (II) include base resins such as above-described acrylic resins, polyester resins or alkyd resins, etc. which are modified with silicone resins. In those modified resins, the amount of silicone resins used is not more than 50 wt%, preferably 3–45 wt%, of the total resins. When the silicone resin content exceeds 50 wt%, inter-layer adhesion between the paint composition formed with the use of such silicone-modified resin and the finish coating thereon is liable to be degraded, and the resin (I) and resin (II) completely separate into two layers, the adhesion of the two layers tending to be aggravated.

silicone resins to be used for modifying the base resins are normally organopolysiloxane resins having number average molecular weight ranging from about 500—about 2,000, and at least 2 reactive groups such as hydroxyl, alkoxy and the like, per molecule, example of which including Z-6018 (product of Dow Corning; molecular weight=1,600), Z-6188 (product of Dow Corning; molecular weight=650), Sylkyd 50, DC-3037 (product of Dow Corning), KR-216, KR-218, KSP-1 [products of Shin-etsu silicone K.K.], TSR-160, TSR-165 [products of Tokyo Shibaura Denki K.K.], SH5050, SH6018, SH6188 [products of Toray siliconee K.K.].

silicone-modified resins can be prepared by co-condensing above-described silicone resins with a base resin having hydroxyl groups and/or carboxyl groups, e.g., acrylic resin, polyester resin, alkyd resin or the like, at aforesaid use ratio, by the method known per se.

The resin compositions of the present invention can be prepared by dispersing and/or dissolving above-described resin (I) and resin (II) in an aqueous medium, by a method known per se. Aqueous liquid dispersions of above resin compositions can be prepared, for example, by ① mixing a solution of said resins (I) and (II) in a water-miscible organic solvent, with water and an acid, e.g., a water-soluble organic or inorganic acid such as acetic acid, formic acid, butyric acid, phosphoric acid, sulfuric acid, etc., to neutralize the whole system to form an aqueous bath; or ② dispersing resin (I) in an aqueous medium, neutralizing the system with an acid to form an aqueous bath, and forcedly dispersing in the aqueous bath a water-miscible organic solvent-solution of resin (II) using a homogenizer or the like. In the aqueous dispersions prepared by either of above methods ① and ②, particles of resin (II) are dispersed in the aqueous medium with high stability by the virtue of the neutralization product of resin (I), and the dispersions exhibit excellent storage stability over prolonged periods.

For preparing above resin compositions, either of resin (I) and resin (II) may be a single resin or a combination of two or more resins. Such resin (I) and resin (II) can be blended at the following weight ratios ranging:

resin (I):resin (II)=15:85–95:5,
preferably 50:50–90:10,
most preferably 60:40–85:15.

At blend ratios outside the above-specified range, it becomes generally difficult to obtain a multi-layered coating having an effective concentration gradient, and both weatherability and corrosion resistance of the coating tend to be lowered.

It is also permissible to add to the resin compositions of the present invention, besides above-described resins (I) and (II), coloring pigments, anti-corrosive pigments, extender and other additives, which are normally used in the field of paints, optionally as necessity demands.

The amount (neutralization number) of the acid to be used for the neutralization (protonation) practiced in the above-described preparation of aqueous dispersions of the resin compositions cannot be strictly defined. Whereas, normally a range of about 5—about 40 KOH mg number, in particular, 10–20 KOH mg number, per gram of the solid resin component, is preferred for favorable electrodeposition characteristics. Thus obtained aqueous dispersions are particularly suitable for use with paints for cationic electrodeposition coating. In such occasions, pigments, solvents, curing catalysts, surfactants, etc. may be added to the dispersions as necessity demands.

Electrodeposition coating:

As the methods and apparatuses for practicing electrodeposition coating using said aqueous resin dispersions or resin compositions provided by the present invention, those methods and apparatuses known per se in the art of electrodeposition coating can be used. In such occasions, it is desirable to use the object to be coated as cathode, and a stainless steel or carbon plate, as anode. Useful electrodeposition coating conditions are not particularly limited, but generally it is desirable to effect the electrodeposition under such conditions as: bath temperature, 20°–30° C.; voltage, 100–400 V (preferably 200–300 V); current density, 0.01–3 A/dm$^2$; electrification time, 1–5 minutes; polar area ratio (A/C), 2/1 to 1/2; inter-polar distance, 10–100 cm; and under agitation.

The coating deposited on the object to be coated is washed, and can be cured by baking at about 140° C.—about 180° C.

Hereinafter the present invention is explained more specifically by the following working examples, in which percents are by weight.

EXAMPLE 1

Into a flask equipped with a stirrer, thermometer, nitrogen inlet tube and a reflux condenser, 700 g of bisphenol A diglycidyl ether having an epoxy equivalent of 190, 192 g of bisphenol A and 13.5 g of dimethylbenzylamine were added and allowed to react at 110° C. until the epoxy group concentration reached 2.24 mmol/g. To the resultant epoxy resin (A) [number average molecular weight, 1025; epoxy equivalent, 539], 2670 g of an acrylic resin (B) which was synthesized by group-transfer polymerization and had a carboxyl group at one of the chain terminals [monomeric composition: 2-(trimethylsiloxy) ethyl methacrylate/butyl methacrylate/2-ethylhexyl methacrylate/methyl methacrylate=34/32/23/11 (%); number average molecular weight (Mn), 3628; Mw/Mn=1.10; acid value of the resin, 15.5] and 515 g of ethylene glycol monobutylether were added, and allowed to react at 110° C. until the epoxy group concentration decreased to 0.380 mmol/g and acid value of the resin became 0. Then the system was cooled down to 100° C., at which point 117 g of diethanolamine (C) was added to the system and allowed to react at 100° C. until all of the epoxy groups disappeared. The system was then diluted with ethylene glycol monobutylether until the solid component occupied 75% of the system, to provide an acrylic-modified epoxy-polyamine resin (1) having a primary hydroxyl equivalent of 505 and an amine value of 18.6.

EXAMPLE 2

Into the same reactor as the one used in Example 1, 700 g of bisphenol A diglycidyl ether having an epoxy equivalent of 190, 192 g of bisphenol A and 13.5 g of dimethylbenzylamine were added and allowed to react at 110° C. until the epoxy group concentration reached 2.24 mmol/g. To the resultant epoxy resin (A) [number average molecular weight, 1025; epoxy equivalent, 539], 2694 g of acrylic resin (B) which was synthesized by group-transfer polymerization and had a carboxyl group at one of the terminals [monomeric composition: 2-(trimethylsiloxy) ethyl methacrylate/butyl methacrylate/methyl methacrylate =37/51/12 (%); number average molecular weight (Mn), 3404; Mw/Mn=1.13; acid value of the resin, 16.5] and 592 g of ethylene glycol monobutyl ether were added. The system was allowed to react at 110° C. until the epoxy group concentration decreased to 0.342 mmol/g and acid value of the resin became 0. The system was then cooled and when the temperature went down to 100° C., 111 g of diethanolamine (C) was added thereto, followed by the reaction at 100° C. until all of the epoxy groups disappeared. The system was diluted with ethylene glycol monobutyl ether to a solid content of 75%, to provide an acrylic-modified epoxy-polyamine resin (2) having a primary hydroxyl equivalent of 483 and an amine value of 17.7.

Comparative Example 1

Into the same reactor as the one used in Example 1, 700 g of bisphenol A diglycidyl ether having an epoxy equivalent of 190, 192 g of bisphenol A and 13.5 g of dimethylbenzylamine were added and allowed to react at 110° C. until the epoxy group concentration reached 2.44 mmol/g. To the resultant epoxy resin (A) [number average molecular weight, 1025; epoxy equivalent, 539], 2381 g of an acrylic resin which was synthesized through ordinary radical polymerization and had carboxyl group(s) at the terminal(s) [monomeric composition: 2-hydroxyethyl methacrylate/styrene/2-ethylhexyl methacrylate/butyl methacrylate=20/40/30/5 (%); polymerization initiator, azobis-n-pentannoic acid; number average molecular weight (Mn), 7120; Mw/Mn=11.8; acid value of the resin, 14.3] and 599 g of ethylene glycol monobutyl ether were added, and allowed to react at 110° C. until the epoxy concentration was decreased to 0.426 mmol/g. Then the system was cooled down to 100° C., at which point 121 g of diethanolamine (C) was added and allowed to react at 100° C. until all the epoxy groups disappeared. The reaction system was then diluted with ethylene glycol monobutyl ether to have a solid content of 75%. Thus an acrylic-modified epoxy-polyamine resin (3) having a primary hydroxyl equivalent of 602 and an amine value of 20.6 was obtained.

EXAMPLE 3

The resins obtained in the foregoing Examples 1 and 2, and Comparative Example 1 were each blended with methyl ethyl ketoxime-blocked isophorone diisocyanate at such ratios that the blocked isocyanate groups became equivalent to the primary hydroxyl groups in the acrylic-modified epoxy-polyamine resin. Furthermore, per 100 g of the solid in each of the resin compositions, 1 g of polypropylene glycol (manufactured by Sanyo Chemical Industries, Ltd., Sunnix PP 4000), 0.82 g of formic acid and 1 g of lead acetate were added. Each system was heated to 40° C., into which deionized water was gradually added under stirring to form an aqueous dispersion. Thus, stable emulsions with 30% solid resin component were obtained. Per 100 g of the solid resin in each of the emulsions, 3 g of basic lead silicate, 13 g of titanium white, 0.3 g of carbon, 3 g of clay, 2 g of dibutyltin oxide and 1 g of non-ionic surfactant (commercial name: Noigen 142B, manufactured by Daiichi Kogyo Seiyaku Co., Ltd.) were added, and each system was subjected to a ball mill operation to cause dispersion of the pigment until the particle sizes were reduced to no greater than 10 microns, followed by dilution with deionized water to the solid resin content of 15%.

Thus obtained three diluted paints were used in cationic electrodeposition coating on untreated steel plates at a bath temperature of 28° C. and voltage of 250 V for 3 minutes. The plates were then baked at 170° C. for 20 minutes to provide enamel-coated panels. Weatherability and corrosion resistance of the resultant panels were measured with the results as shown in Table 1.

The measurement methods of the weatherability and corrosion resistance as indicated in Table 1 are as follow.

(*1) Weatherability

Above coated panels were further painted with a clear top paint (Magicron 7000, product of Kansai Paint Co., Ltd.) to provide weatherability test panels. The test panels were subjected to repeated test cycles composed of 20 hours' exposure to Sunshine Weathermeter (test temperature, 63°±3° C.; spray time cycle, 12 minutes in 60 minutes; humidity, 50±5%) and 2 hours' 40° C. warm water dipping. At the end of each cycle the painted plates were given a cross-cut and peeled with a cellophane tape. Whereby adhesion between the electrodeposited coating and the clear top paint layer was evaluated. When nearly no peeling of the clear top occurred, the adhesion was evaluated as ◯, and when the peeling occurred in wide scale around the cross-cut, X. The weatherability evaluation is expressed by the number of testing hours until the X evaluation occurred.

(*2) Corrosion resistance (resistance to salt spray)

The electrodeposition-coated plates were entered with cross-cuts, and tested in the manner following JIS Z2871. After 480 hours, the cross-cut portions were peeled off by means of a cellophane tape and width of the peeled portion was measured.

TABLE I

|  |  | Example 1 | Example 2 | Comparative Example 1 |
|---|---|---|---|---|
| Base resin | acrylic-modified epoxypolyamine resin solid component (g) | 75 | 75 | 75 |
| Curing agent | methyl ethyl ketoxime blocked isophorone diisocyanate solid component (g) | 25 | 25 | 25 |
| Performance of painted film | condition of painted surface (visual observation) | good | good | poor |
|  | weatherability (*1) | at least 600 hours | at least 600 hours | at least 600 hours |
|  | corrosion resistance (*2) | 1 mm | 1 mm | 10 mm |

EXAMPLE 4

(Preparation of Non-ionic Acrylic Resin)

|  |  | (parts) |
|---|---|---|
| ① | Butyl cellosolve | 26 |
| ② | 80% Polyester monomer ("FM-3X" made by Daicel Chemical Industries, Ltd.) | 37.5 |
| ③ | Styrene | 40 |
| ④ | Hydroxyethyl methacrylate | 25 |
| ⑤ | n-Butyl methacrylate | 5 |
| ⑥ | AIBN (azobisisobutyronitrile) | 4 |
| ⑦ | Butyl cellosolve | 5 |
| ⑧ | Azobisdimethyl valeronitrile | 0.5 |
| ⑨ | Cellosolve | 23 |

The component ① was heated to 130° C., and at said temperature components ② to ⑥ were added to the system dropwise, which consumed 5 hours. Then the system was maintained at 130° C. for 2 hours, followed by dropwise addition of components ⑦ and ⑧ over② hours at 130° C., and 2 hours' standing at 130° C. Further the component ⑨ was added and the system was cooled. Thus a solution of a non-ionic acrylic resin having a number average molecular weight of about 5,000 was obtained, with a solid content of 62%.

EXAMPLE 5

The acrylic-modified epoxy-polyamine resin (I) as obtained in above Example 1 and the non-ionic acrylic resin (II) as obtained in Example 4 were blended with methyl ethylketoxime blocked isophorone diisocyanate at such a ratio that the blocked isocyanate groups became equivalent to the primary hydroxyl groups in the resins (I) and (II). Furthermore, per 100 g of the solid component in the resin composition, 1 g of polypropylene glycol ("Sunnix PP 4000" manufactured by Sanyo Chemical Industries, Ltd.), 0.82 g of formic acid and 1 g of lead acetate were added. Under heating to 40° C. with agitation, deionized water was slowly added to the system to form an aqueous dispersion. Thus a stable emulsion with solid resin content of 30% was obtained. Per 100 g of the solid resin component in the emulsion, 3 g of basic lead silicate, 13 g of titanium white, 0.3 g of carbon, 3 g of clay, 2 g of dibutyltin oxide and 1 g of non-ionic surfactant (commercial name: "Noigen 142B", product of Daiichi Kogyo Seiyaku Co.) were added to the emulsion, and the pigment was dispersed in a ball mill until its particle size was reduced to no greater than 10 microns. The emulsion was further diluted with deionized water to make the solid resin content 15%. The blend ratio between the resin (I) and resin (II) was varied for each run as indicated in Table 2, while other conditions were unchanged.

Thus obtained cationic electrodeposition paint compositions were used in cationic electrodeposition coating on unreacted steel plates at a bath temperature of 28° C. and voltage of 250 V for 3 minutes. The plates were then baked at 170° C. for 20 minutes to provide enamele coated panels. Weatherability and corrosion resistance of the panels were measured in the same manner as described in Example 3. The results are also shown in Table 2.

TABLE 2

|  | Example | | | Comparative Example | |
|---|---|---|---|---|---|
|  | 5 | 6 | 7 | 2 | 3 |
| Resin (I) | 67 | 52 | 38 | 7 | 75 |
| Resin (II) | 8 | 23 | 37 | 68 | 0 |
| Crosslinking agent | 25 | 25 | 25 | 25 | 25 |
| Performance of coating |  |  |  |  |  |
| Condition of coated surface | o | o | o | x | o |
| Weatherability | 700 H< | 800 H< | 800 H< | 800 H< | 600 H< |
| Corrosion resistance | 1.0 mm | 1.0 mm | 1.5 mm | 10.0 mm | 1.0 mm |

What we claim is:

1. A resin composition which comprises (I) an acrylic-modified epoxy-polyamine resin composed of
      (A) a bisphenolic epoxy resin containing at least two epoxy groups per molecule; and following components (B) and (C) which are bound to at least a part of said epoxy groups
      (B) an acrylic resin having on the average at least one functional group per molecule, which group being capable of reacting with said epoxy group, the molecular weight distribution of said acrylic resin as expressed by weight average molecular weight (Mw)/number average molecular weight (Mn) being within a range of 1 to 1.2; and
      (C) an active hydrogen-containing amino compound, and
   (II) non-ionic film-forming resin at a ratio ranging resin (I): resin (II)=15:85–95:5 (by weight).

2. Cationic electrodeposition coating bath composed of the resin composition as defined in claim 1.

3. Cationic electrodeposition coating method which is characterized by using the resin composition as defined in claim 1.

4. The composition as defined in claim 1, in which the non-ionic, film-forming resin (II) is non-ionic acrylic resin.

5. The composition as defined in claim 1, in which resin (I):resin (II)=50:50–90:10 (weight ratio).

6. The composition as defined in claim 1, which is in the form of an aqueous dispersion.

7. A resin composition as defined in claim 1, in which the bisphenolic epoxy resin (A) is one obtained through condensation reaction of a bisphenolic compound with epihalohydrin.

8. A resin composition as defined in claim 7, in which the bisphenolic compound is selected from a group consisting of bis(4-hydroxyphenyl)-2,2-propane, bis(4-hydroxyphenyl)-1,1-ethane, bis(4-hydroxyphenyl)-methane, 4,4'-dihydroxydiphenyl ether, 4,4'-dihydroxydiphenyl sulfone, bis(4-hydroxyphenyl)-1,1-isobutane and bis(4-hydroxy)-3-t-butylphenyl)-2,2-propane.

9. A resin composition as defined in claim 1, in which the bisphenolic epoxy resin (A) is one expressed by the formula below:

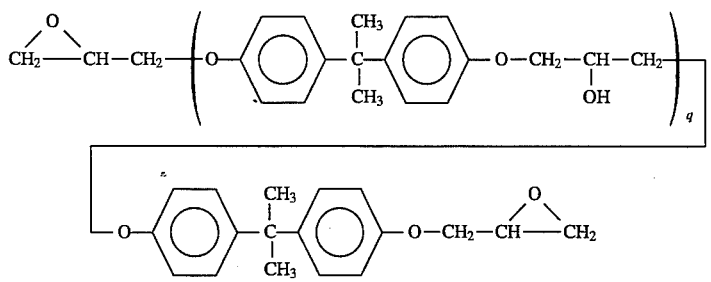

in which q stands for a number of 2–20.

10. A resin composition as defined in claim 1, in which the bisphenolic epoxy resin (A) has a number of average molecular weight ranging from about 310 to about 10,000 and an epoxy equivalent ranging from about 155 to about 5,000.

11. A resin composition as defined in claim 1, in which the acrylic resin (B) has a molecular weight distribution within a range of 1 to 1.1.

12. A resin composition as defined in claim 1, in which the acrylic resin (B) has, on the average, 1 to 2 functional groups per molecule which are capable of reacting with epoxy groups.

13. A resin composition as defined in claim 1, in which the acrylic resin (B) has a number average molecular weight within a range of from about 1,500 to about 5,000.

14. A resin composition as defined in claim 1, in which the active hydrogen-containing compound (C) is an amino compound containing 1 to 4 active hydrogen atoms.

15. A resin composition as defined in claim 1, in which the active hydrogen-containing amino compound (C) is selected from the group consisting of aliphatic, alicyclic or aromatic-aliphatic primary or secondary amines, alkanol amines, modified products thereof and tertiary amine salts.

16. A resin composition as defined in claim 1, which contains 16–90% by weight, based on the total weight of the bisphenolic epoxy resin (A) and acrylic resin (B), of the acrylic resin (B).

17. A resin composition as defined in claim 1, which contains 35–80% by weight, based on the total weight of the bisphenolic epoxy resin (A) and acrylic resin (B), of the acrylic resin (B).

18. A resin composition as defined in claim 1, in which the acrylic-modified epoxy-polyamine resin has an amine value within a range of 15–100.

19. A resin composition as defined in claim 1, in which the acrylic-modified epoxy-polyamine resin has an amine value within a range of 15–70.

20. A resin composition as defined in claim 1, in which the acrylic-modified epoxy-polyamine resin has a number average molecular weight within a range of 1,000–20,000.

21. A resin composition as defined in claim 1, in which the acrylic-modified epoxy-polyamine resin has a primary hydroxyl equivalent within a range of 400–700.

22. A resin composition as defined in claim 1, which further contains a crosslinking agent.

23. A composition as defined in claim 1, in which the non-ionic, film-forming resin (II) is selected from the group consisting of non-ionic acrylic resins, non-ionic polyester resins and non-ionic silicone-modified resins obtained by co-condensing a silicone resin with a non-ionic acrylic resin, a non-ionic polyester resin or a non-ionic alkyd resin.

* * * * *